Patented Mar. 8, 1949

2,463,998

UNITED STATES PATENT OFFICE 2,463,998

ISOTHIOUREIDES OF ALIPHATIC SULFIDES

Ewald Rohrmann, Indianapolis, Ind., assignor to Eli Lilly and Company, Indianapolis, Ind., a corporation of Indiana No Drawing. Application May 16, 1947,
Serial No. 748,671

6 Claims. (Cl. 260—564)

The present invention relates to new organic sulfides and more particularly to isothioureides of dialkyl sulfides and to the process of making them.

The compounds of this invention are the bases represented by the formula

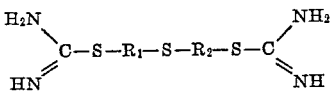

wherein $R_1$ and $R_2$ each represents a radical which links its adjoining sulfur atoms with a polymethylene chain of from 2 to 5 carbon atoms, and acid addition salts of such bases.

In the compounds as represented by the foregoing formula, the $R_1$ and $R_2$ radicals may be either the same or different, and the polymethylene chains of the $R_1$ and $R_2$ radicals are preferably either unsubstituted or substituted only with lower aliphatic substituents, but they may be otherwise substituted, as with mononuclear carbocyclic, lower aliphatic ether, or other like substituents. For example, where $R_1$ is the propylene radical and $R_2$ is the ethylene radical the compound is 3-isothioureidopropyl 2-isothioureidoethyl sulfide and may be represented by the formula

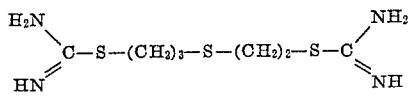

Again, where $R_1$ is an ethylene radical which is methyl-substituted in the 2 position and $R_2$ is the butylene radical the compound is 2-isothioureido-2-methylethyl 4-isothioureidobutyl sulfide and may be represented by the formula

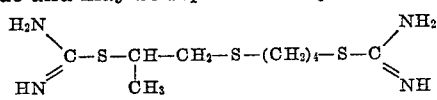

Where $R_1$ is an ethylene radical which is phenyl substituted in the 2 position and $R_2$ is the ethylene radical, the compound is 2-isothioureido-2-phenylethyl 2-isothioureidoethyl sulfide. Where $R_1$ is a propylene radical which is substituted in the 2 position with an ethoxyethyl group, and $R_2$ is the propylene radical, the compound is 3-isothioureido-2-ethoxyethylpropyl 3 - isothiouredopropyl sulfide. Similarly, $R_1$ or $R_2$ may be radicals in which the polymethylene chain carries other substituents, including for example radicals having unsaturated substituents, such as the 2-vinylethyl radical.

In general, the bases of the compounds of my invention are oils when the compounds are of low molecular weight and solids when of higher molecular weight, and are somewhat unstable. The acid addition salts of these bases are stable white crystalline substances, which are soluble in water and in alcohol, and insoluble in ether and in acetone.

The new compounds may be prepared by reacting thiourea with a dihalodialkyl sulfide represented by the following formula $$\text{Ha}—R_1—S—R_2—\text{Ha}$$

wherein $R_1$ and $R_2$ have the same significance as before, and Ha represents a halogen attached to the omega carbon atom of the polymethylene chain of the adjoining R-radical. In a preferred method of preparing these compounds the intermediate dihalodialkyl sulfide is condensed with a two-molecular equivalent amount of thiourea by refluxing in an inert mutual solvent, and isolating the resulting acid addition salt of the di-isothioureido-dialkyl sulfide formed in the reaction. The free base may be liberated by the addition of an excess of alkali to the reaction mixture, but I prefer to obtain the compounds as their acid addition salts, because of the relative instability of the free bases. For example, the 2-isothioureidopropyl 2-isothioureidoethyl sulfide mentioned above may be obtained in the form of its dihydrochloride, as a crystalline material melting at about 185°–187° C.

The new di-isothioureido dialkyl sulfides of my invention preferably are employed in the form of their salts, and have valuable properties in combating infections due to protozoan organisms.

The following specific examples illustrate the preparation of the new compounds.

Example 1

3 - isothioureidopropyl 2 - isothioureido - 2 - methylethyl sulfide dihydrochloride represented by the formula

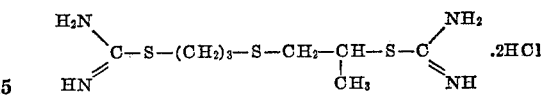

may be prepared by the following process:

The intermediate 3-chloropropyl 2-chloro-3-methylethyl sulfide may be obtained in any desired manner. Conveniently, it may be prepared as follows: To a solution of 22 g. of sodium in 475 ml. of absolute ethanol are added 88 g. of 1-thiol-3-hydroxy propane, followed by 90 g. of anhydrous 1-chloro-2-hydroxy propane. Sodium chloride begins to separate immediately and the mixture is refluxed for 6 hours. The precipitated sodium chloride is then filtered off, and the filtrate is fractionally distilled under reduced pressure. The fraction boiling from 193–197° C. at about 32 mm. pressure is retained, and consists essentially of 3-hydroxypropyl 2-hydroxy-2-methylethyl sulfide. A solution of 75 g. of this product dissolved in 100 ml. of chloroform is added to a cooled solution of 160 g. of thionyl chloride in 200 ml. of chloroform, over a period of 1 hour. The chloroform is then removed by evaporation under reduced pressure, to leave a residue which is the desired intermediate 3-chloropropyl 2-chloro-2-methylethyl sulfide having the following formula

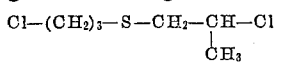

The 3-chloropropyl 2-chloro-2-methylethyl sulfide is dissolved in 200 ml. of absolute ethanol, and to this solution are added 75 g. of thiourea and the mixture is refluxed for 20 hours. The reaction mixture is diluted with 1:1 acetone-ether until turbid, and is then cooled to 0° C. White crystals slowly separate. When the precipitation is complete the crystals are filtered off, washed with acetone-ether and dried at 65° C. The crystalline material so obtained is the desired 3-isothioureido-propyl 2-isothioureido-2-methylethyl sulfide dihydrochloride, and melts at 135.5° C.

The corresponding base may be liberated by treating the refluxed reaction mixture with an excess of an alkali, such as sodium hydroxide.

*Example 2*

Di-(2-isothioureido-2-methylethyl) sulfide dihydrochloride having the following formula

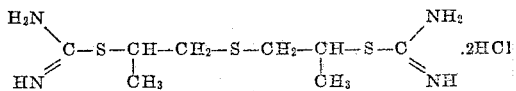

may be prepared by the following process:

To prepare the desired intermediate, 350 g. of 1-chloro-2-hydroxy propane are dissolved in 1150 ml. of water and 493 g. of sodium sulfide added while stirring, with the rate of addition such that the temperature is maintained at 30 to 35° C. After all of the sodium sulfide has been added the reaction mixture is heated at 90–95° C. for 1 hour. It is then cooled, neutralized with hydrochloric acid, and filtered, and the filtrate is evaporated to near dryness in vacuo. The residue is extracted with hot ethanol and then filtered, and the filtrate is distilled under reduced pressure. The fraction boiling from 165–170° C. at about 25 mm. pressure is retained, and consists essentially of di-(2-hydroxy-2-methylethyl)-sulfide. A solution of 75 g. of this product dissolved in 100 ml. of chloroform is then added to a cooled solution of 160 g. of thionyl chloride in 200 ml. of chloroform, over a period of 1 hour. The chloroform is thereupon removed by evaporation, to leave as a residue crude di-(2-chloro-2-methylethyl)-sulfide represented by the formula

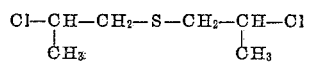

This dichloro dialkyl sulfide is dissolved in 200 ml. of absolute ethanol, and to this solution 75 g. of thiourea are added and the mixture is refluxed for 20 hours. The reaction mixture is thereafter diluted with 1:1 acetone-ether until turbid, and then cooled to 0° C. White crystals separate on standing and are filtered off, washed with acetone-ether and dried at about 65° C. The crystalline material so obtained is the desired di-(2-isothioureido - 2 - methylethyl) - sulfide dihydrochloride.

*Example 3*

3-isothioureidopropyl 2-isothioureidoethyl sulfide dihydrochloride represented by the formula

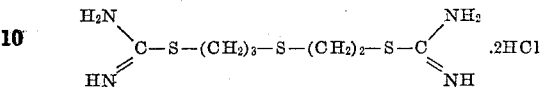

may be prepared as follows:

140 g. of 3-chloropropyl-2-chlorethyl sulfide, which may be obtained by a preparation analogous to that in Example 1, are dissolved in 400 ml. of absolute ethanol, and 152 g. of thiourea are added. The solution is refluxed for 20 hours. The reaction mixture is thereupon treated with 1:1 acetone-ether until it becomes turbid and is then cooled to 0° C. White crystals of 3-isothioureidopropyl 2-isothiourethyl sulfide dihydrochloride separate on standing and are filtered off, washed with acetone-ether, recrystallized from alcohol-acetone, and dried. The dried salt melts at 185–187° C.

*Example 4*

Di-(2-isothioureidoethyl)-sulfide dihydrochloride having the following formula

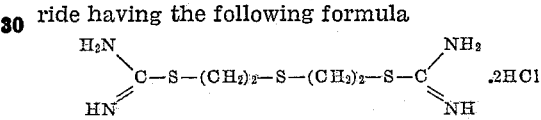

may be prepared as follows:

The intermediate di-(2-chloroethyl)-sulfide may be obtained by heating 50 g. of di-(2-hydroxyethyl)-sulfide with 200 cc. of concentrated hydrochloric acid on a steam bath for 1 hour, cooling and allowing the mixture to separate into two layers, and recovering the lower layer.

This product is refluxed in 250 cc. of ethanol with 53 g. of thiourea, to produce the desired di-(2-isothioureidoethyl) - sulfide dihydrochloride, which is recovered from the reaction mixture by adding absolute ether and cooling.

*Example 5*

2-isothioureido-2-phenethyl 2 - isothioureidoethyl sulfide dihydrochloride having the following formula

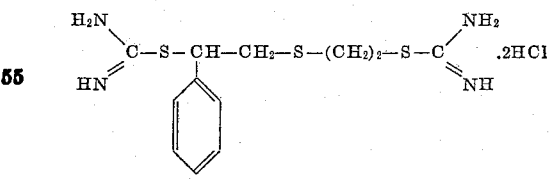

may be prepared by repeating Example 1, and in the preparation of the intermediate using 1-chloro-2-phenyl-2-hydroxyethane instead of 1-chloro-2-hydroxypropane.

*Example 6*

Example 1 may be repeated using other intermediates; which may be prepared as set forth in Example 1 save that instead of 1-chloro-2-hydroxypropane I may use an equivalent amount of another chlorohydroxy polymethylene compound, which may contain other desired substituents. For example, by using 1-chloro-2-benzyl-2-hydroxyethane, i. e., 1-chloro-2-hydroxy-3-phenylpropane, I may obtain 2-isothioureido-2-benzylethyl 2-isothioureidoethyl sulfide hydrochloride; by using 1-chloro-2-isoamyl-2-hydroxyethane, I may obtain 2-isothioureido-2-isoamylethyl 2-isothioureidoethyl sulfide dihydrochloride; by using 1-chloro-2-methoxyethyl-2-hydroxyethane, I may obtain 2-isothioureido-2-methoxyethylethyl 2-isothioureidoethyl sulfide dihydrochloride; and by using 1-chloro-2-vinyl-2-hydroxyethane, I may obtain 2-isothioureido-2-vinylethyl 2-isothioureidoethyl sulfide dihydrochloride. Likewise, in preparing other intermediates, either with or without modifications such as those indicated above, instead of the 1-thiol-3-hydroxypropane of Example 1, an equivalent amount of another thiol-hydroxy-alkane compound may be used, which may contain other substituents; and the intermediates so prepared may be used to produce final compounds containing $R_1$ and $R_2$ radicals corresponding to the structure of the intermediates.

*Example 7*

Example 2 may be repeated, save that instead of di-(2-chloro-2-methylethyl)-sulfide I may use some other di-(chloroalkyl) sulfide in which the alkyl group contains a polymethylene chain of from 2 to 5 carbon atoms and may carry other substituents. The intermediate di-(chloroalkyl)-sulfides may be prepared as set forth in Example 2, save that instead of 1-chloro-2-hydroxypropane, I may use a corresponding compound which contains the skeleton of the desired $R_1$ and $R_2$ substituents of the final compound. Reaction of such intermediates with thiourea replaces the chloro substituents thereof and produces the desired di-(isothioureidoalkyl)-sulfides in the form of their dihydrochlorides.

*Example 8*

Any of the preceding examples may be repeated, save that instead of using chloro-substituted compounds, corresponding bromo- or iodo-substituted compounds may be used. In such case, the isothioureidoalkyl sulfides are produced in the form of their dihydrobromides or dihydro iodides; and from these, as in the case of the dihydrochlorides, the free bases may be liberated by treatment with an alkali. If desired, any other acid salt may now be prepared by treating the free base with 2 molecular equivalents of the desired acid, such as sulfuric, hydrochloric, nitric, etc., and recrystallizing.

I claim:

1. A compound of the class consisting of dithioureides and their acid addition salts, said dithioureides represented by the formula

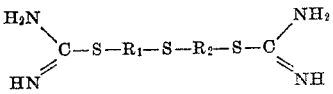

wherein $R_1$ and $R_2$ are alkylene radicals having from 2 to 5 carbon atoms, and the sulfur atoms joined to said radicals are separated by at least 2 carbon atoms.

2. An acid addition salt of 2-isothioureidoethyl 3-isothioureidopropyl sulfide represented by the formula

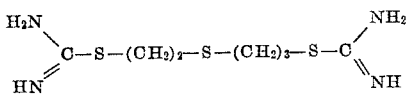

3. An acid addition salt of 2-isothioureido-2-methylethyl 3-isothioureidopropyl sulfide represented by the formula

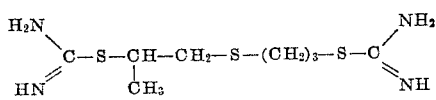

4. An acid addition salt of di-(2-isothioureido-2-methylethyl) sulfide represented by the formula

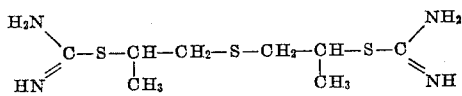

5. 2-isothioureidoethyl 3 - isothioureidopropyl sulfide dihydrochloride.

6. 2-isothioureido-2-methylethyl 3 - isothioureido-propyl sulfide dihydrochloride.

EWALD ROHRMANN.

REFERENCES CITED

The following references are of record in the file of this patent:

UNITED STATES PATENTS

| Number | Name | Date |
|---|---|---|
| 2,147,346 | Johnson | Feb. 14, 1939 |
| 2,302,762 | Graennacher et al. | Nov. 24, 1942 |